US012593000B2

(12) United States Patent
Kitajima

(10) Patent No.: US 12,593,000 B2
(45) Date of Patent: Mar. 31, 2026

(54) IMAGE-FORMING SYSTEM, CONTROL METHOD, AND INFORMATION PROCESSING APPARATUS

(71) Applicant: CANON KABUSHIKI KAISHA, Tokyo (JP)

(72) Inventor: Keisuke Kitajima, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 277 days.

(21) Appl. No.: 18/590,148

(22) Filed: Feb. 28, 2024

(65) Prior Publication Data

US 2024/0297947 A1    Sep. 5, 2024

(30) Foreign Application Priority Data

Mar. 3, 2023    (JP) ................................. 2023-033071

(51) Int. Cl.
H04N 1/387        (2006.01)
H04N 1/00         (2006.01)

(52) U.S. Cl.
CPC ......... H04N 1/3872 (2013.01); H04N 1/0044 (2013.01)

(58) Field of Classification Search
None
See application file for complete search history.

(56) References Cited

U.S. PATENT DOCUMENTS

2011/0216373 A1*  9/2011  Sugimoto .......... H04N 1/00567
                                                            358/3.26
2022/0382203 A1*  12/2022  Makino .............. G03G 15/5041

FOREIGN PATENT DOCUMENTS

JP        2012053089 A        3/2012
JP        2017222130 A        12/2017

* cited by examiner

*Primary Examiner* — Andrew H Lam

(74) *Attorney, Agent, or Firm* — ROSSI, KIMMS & McDOWELL LLP

(57)        ABSTRACT

An image-forming system includes an image-forming unit that forms an image of a print job on a sheet having a trimming region based on an image-forming condition; and a processor. The image of the print job includes first and second user images. The processor controls the image-forming unit to form a pattern for adjustment in the trimming region, obtains read image data related to the pattern for adjustment formed on the sheet, and adjusts the image-forming condition based on the read image data. The processor controls a display to display a print preview that represents: the first user image in a print region of the sheet that is different from the trimming region, the second user image in the trimming region, and the pattern for adjustment in the trimming region.

12 Claims, 13 Drawing Sheets

F I G. 3
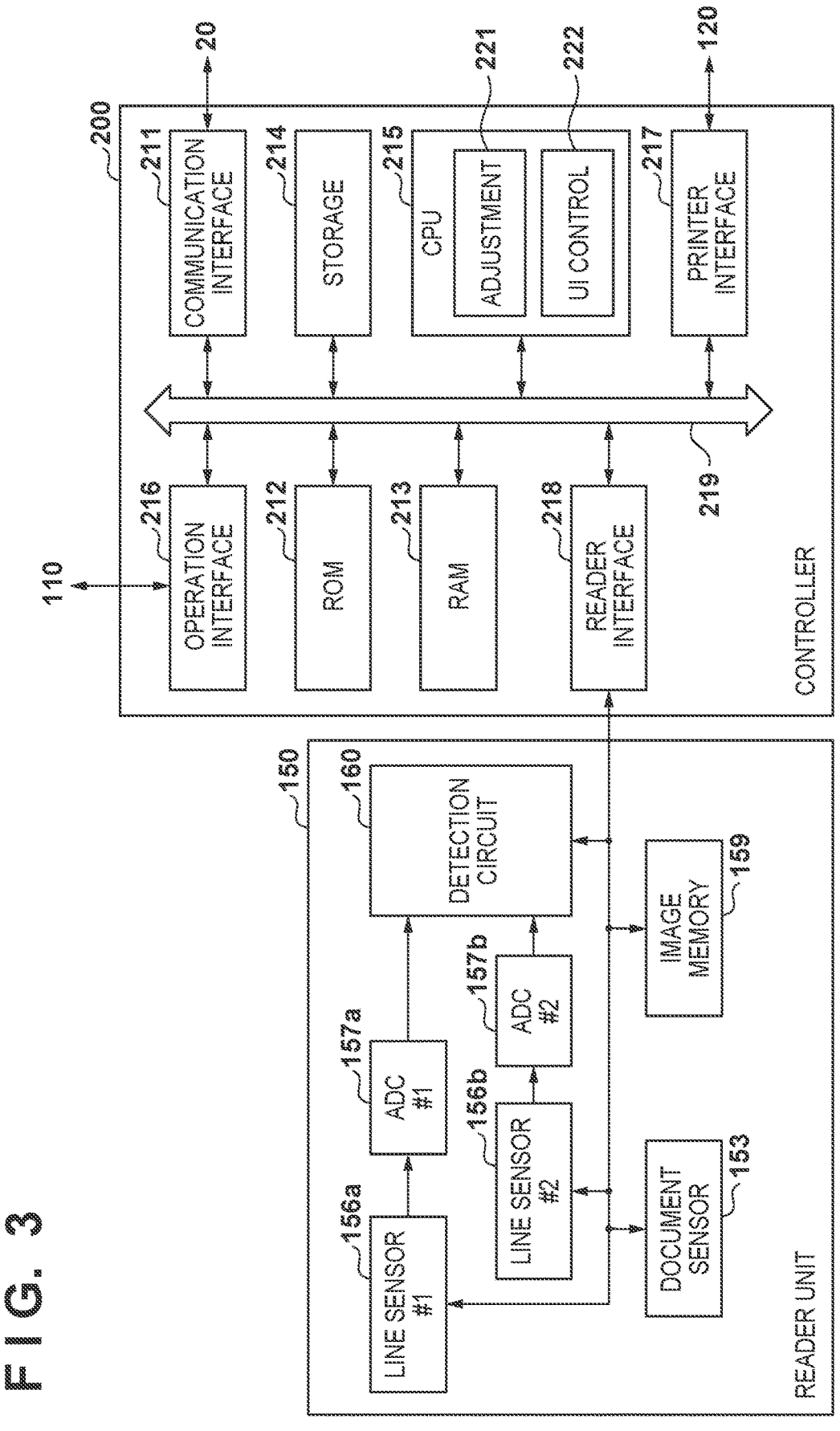

F I G. 4A
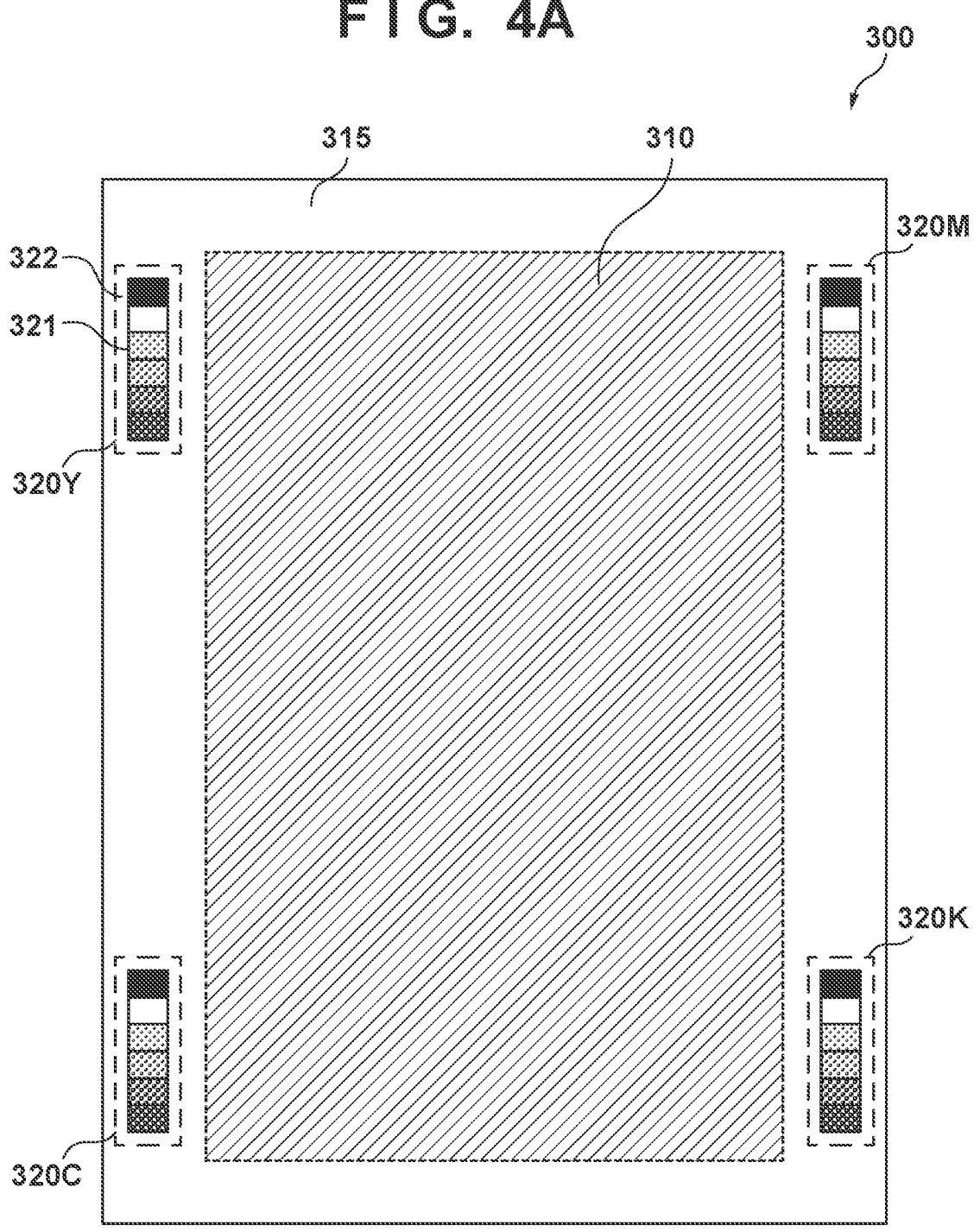

F I G. 4B
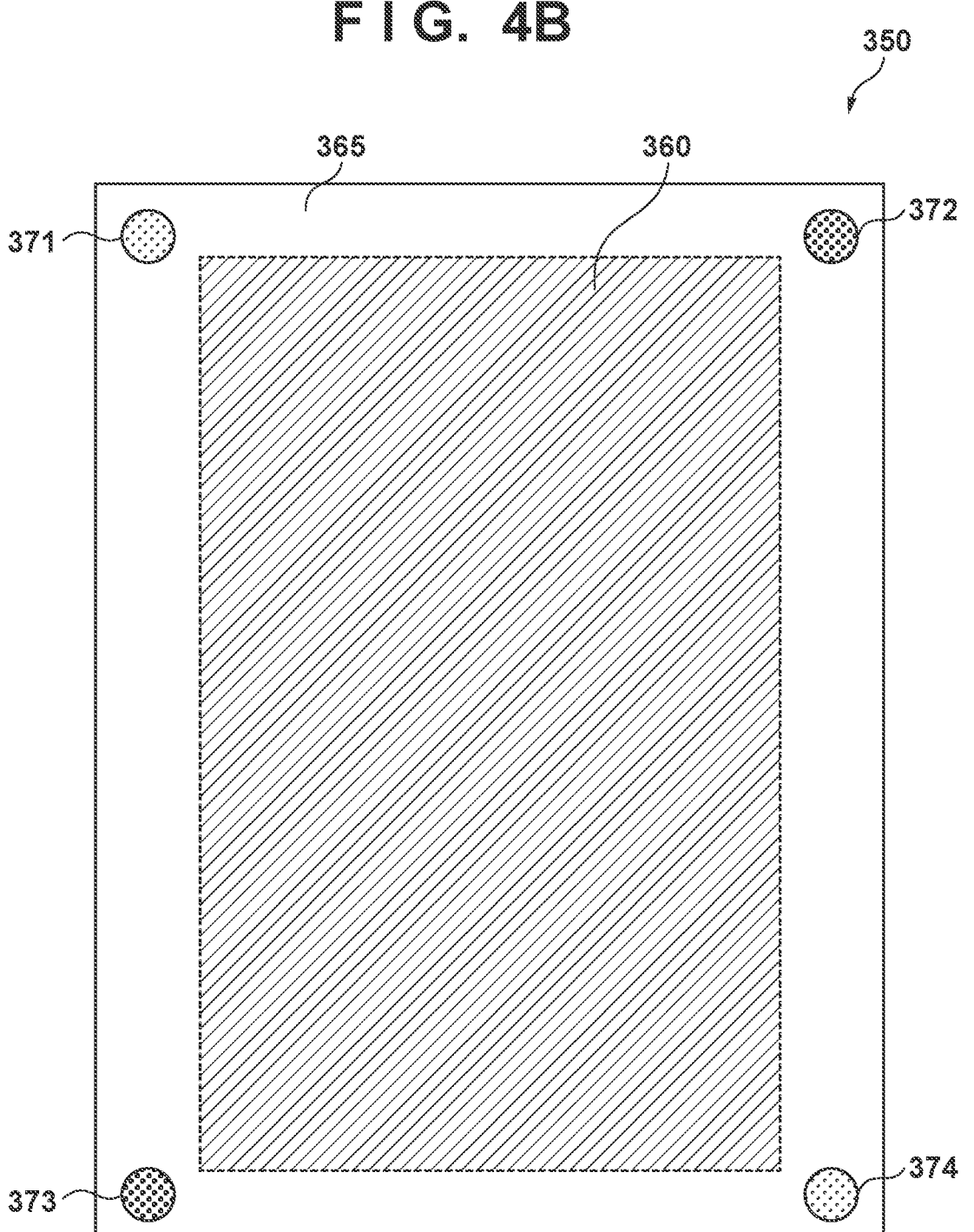

F I G. 5

F I G. 7A
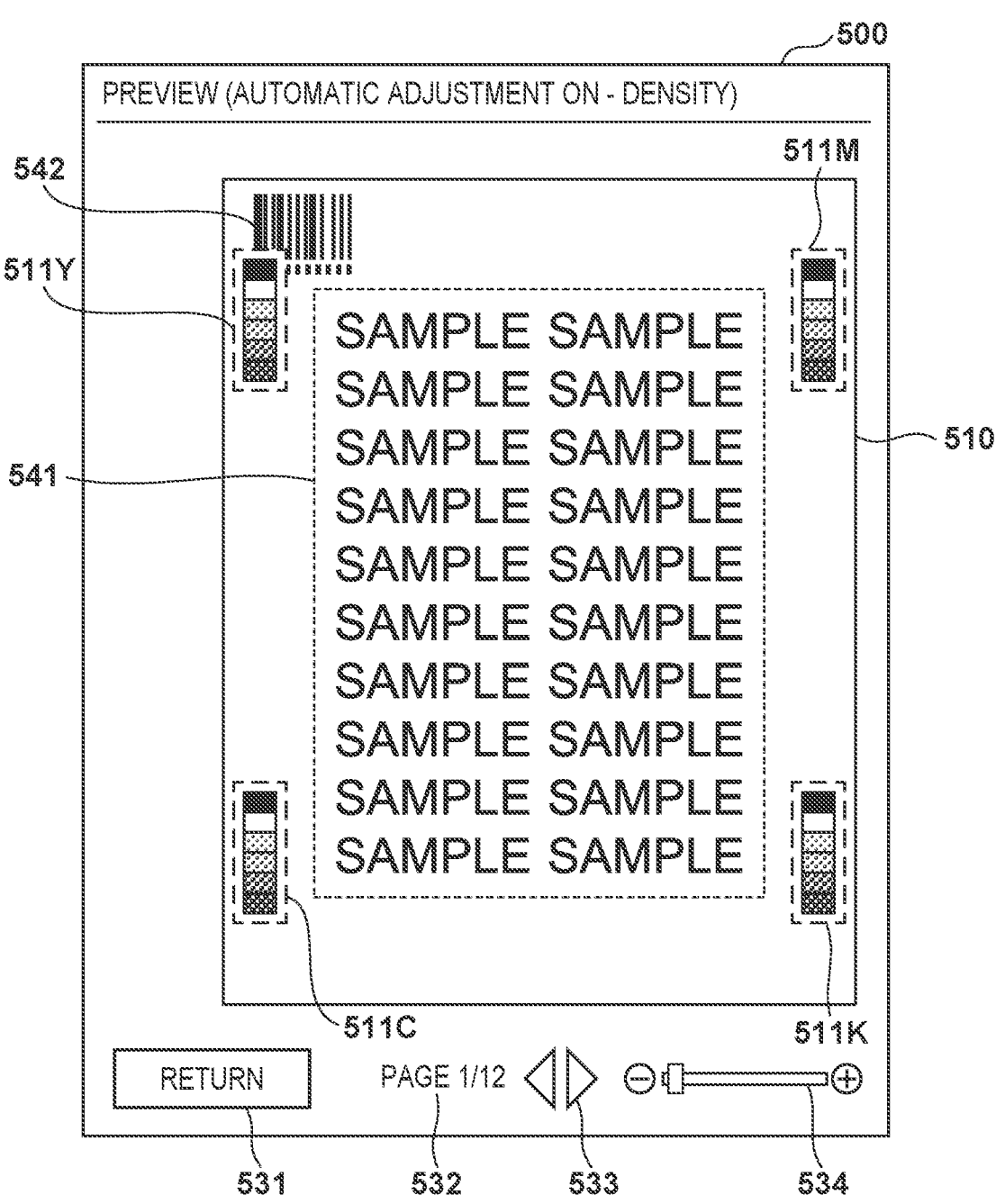

F I G. 7B
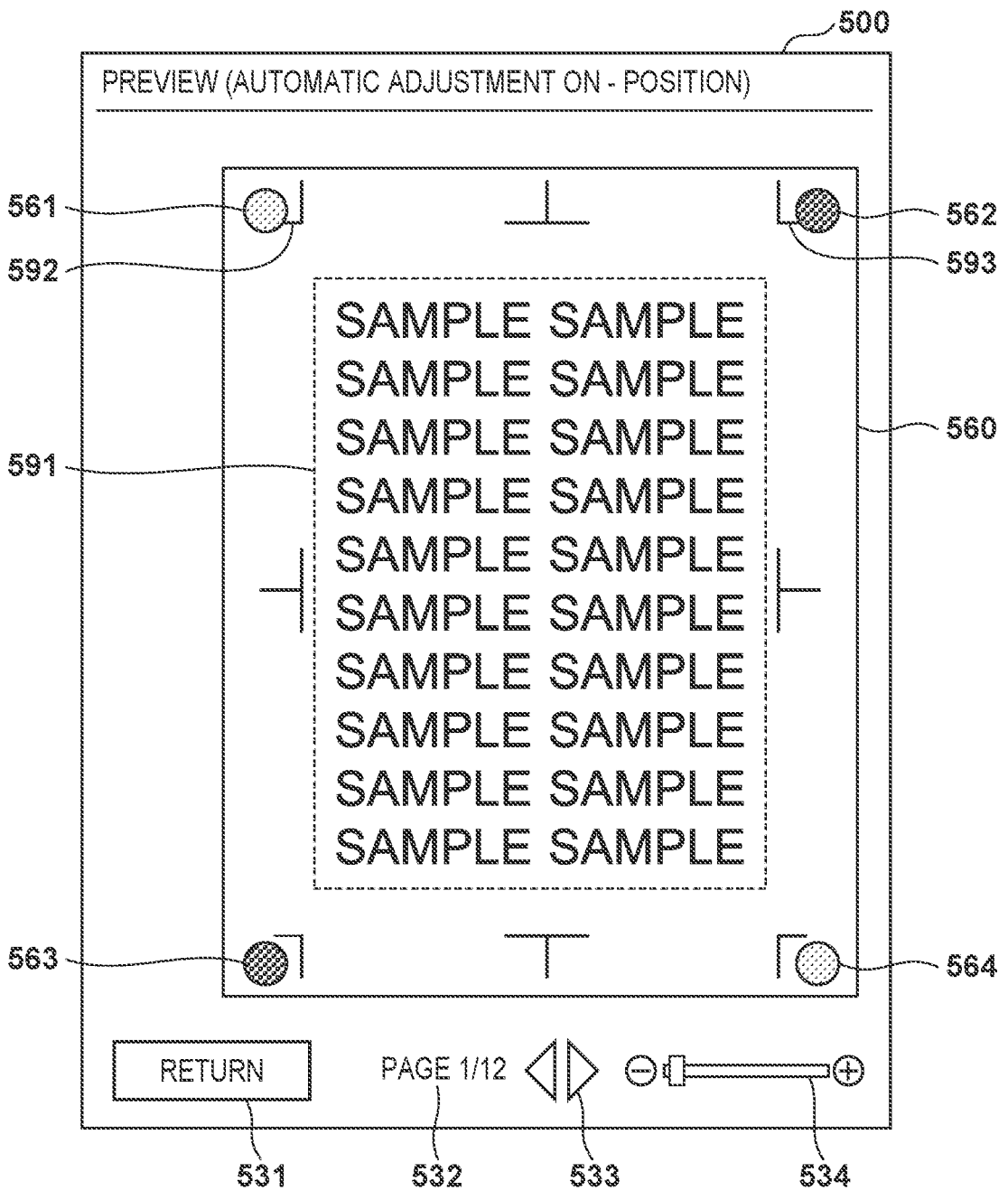

F I G.   8

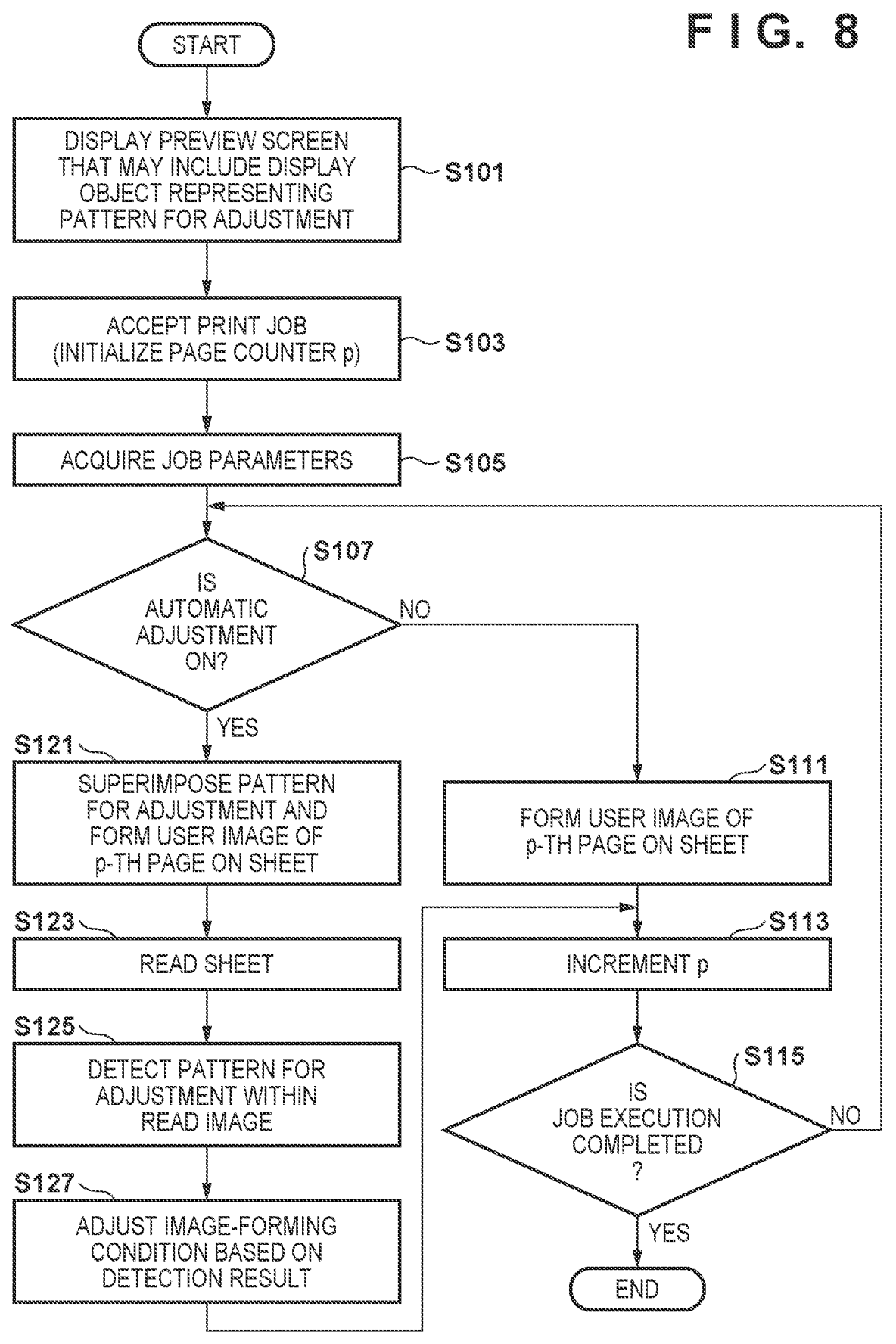

START

DISPLAY PREVIEW SCREEN
THAT MAY INCLUDE DISPLAY
OBJECT REPRESENTING
PATTERN FOR ADJUSTMENT — S101

ACCEPT PRINT JOB
(INITIALIZE PAGE COUNTER p) — S103

ACQUIRE JOB PARAMETERS — S105

S107
IS
AUTOMATIC
ADJUSTMENT
ON?

NO

YES

S121
SUPERIMPOSE PATTERN
FOR ADJUSTMENT AND
FORM USER IMAGE OF
p-TH PAGE ON SHEET

S111
FORM USER IMAGE OF
p-TH PAGE ON SHEET

S123
READ SHEET

S113
INCREMENT p

S125
DETECT PATTERN FOR
ADJUSTMENT WITHIN
READ IMAGE

S115
IS
JOB EXECUTION
COMPLETED
?

NO

S127
ADJUST IMAGE-FORMING
CONDITION BASED ON
DETECTION RESULT

YES

END

F I G. 9
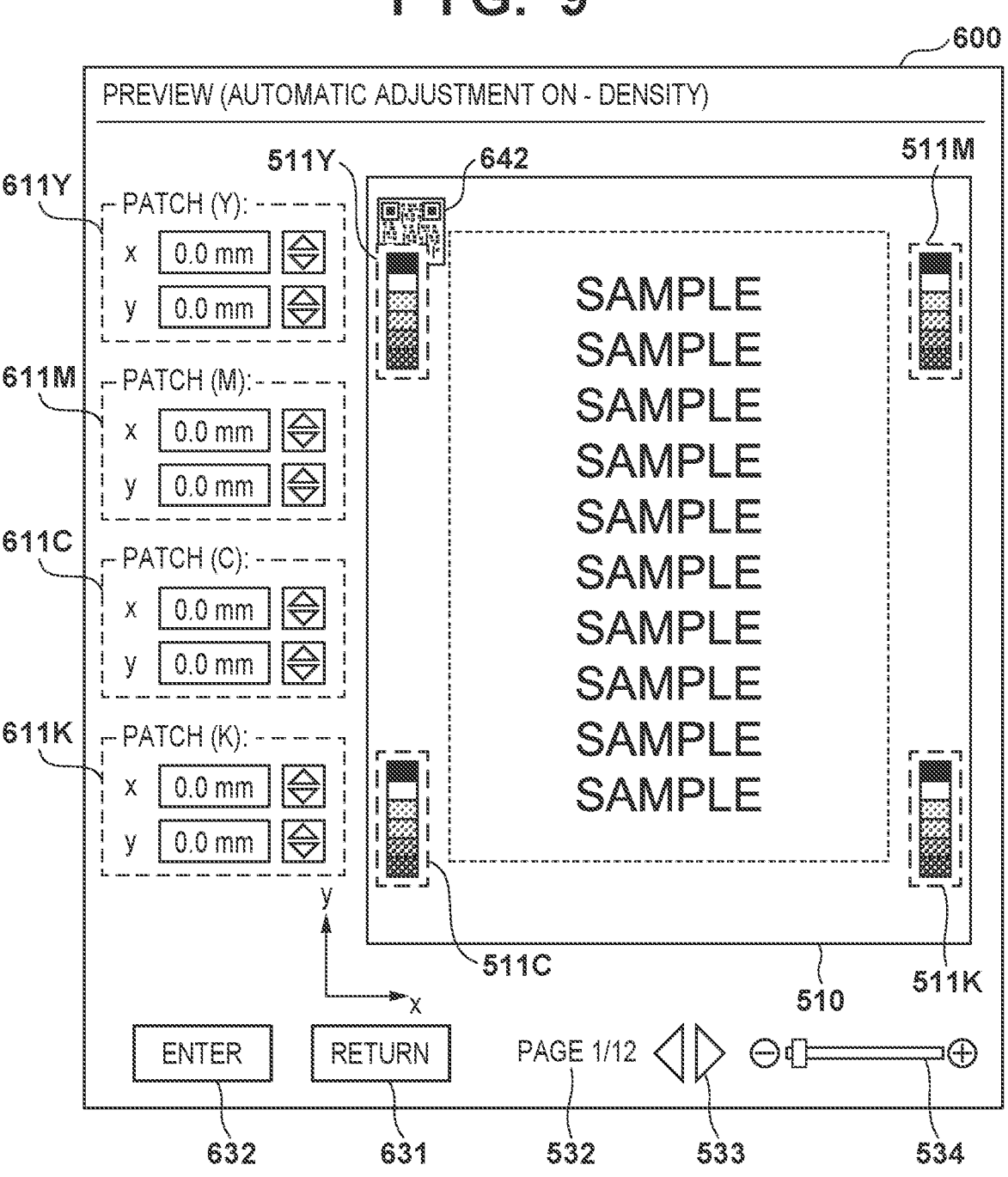

F I G.  10
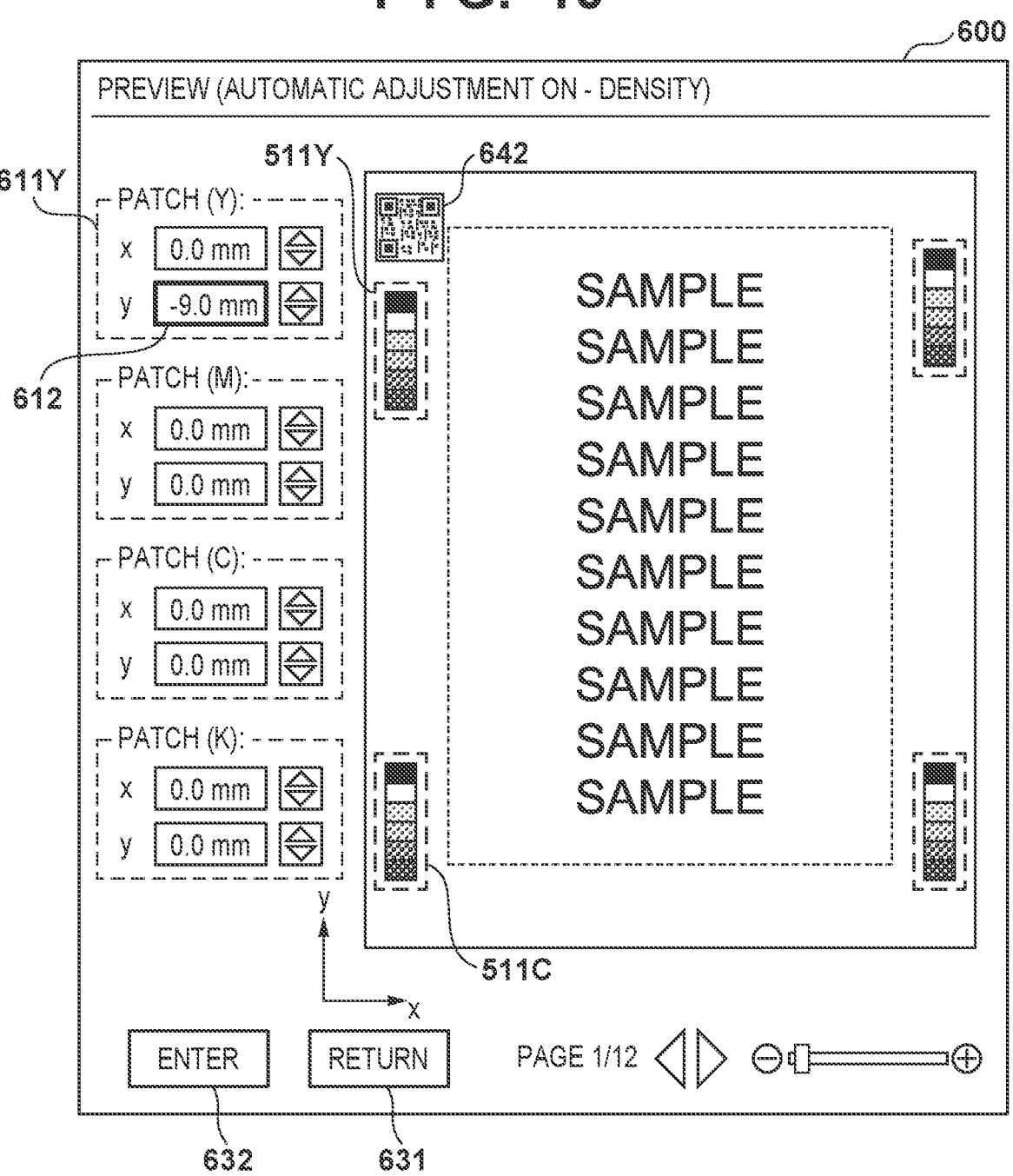

FIG. 11

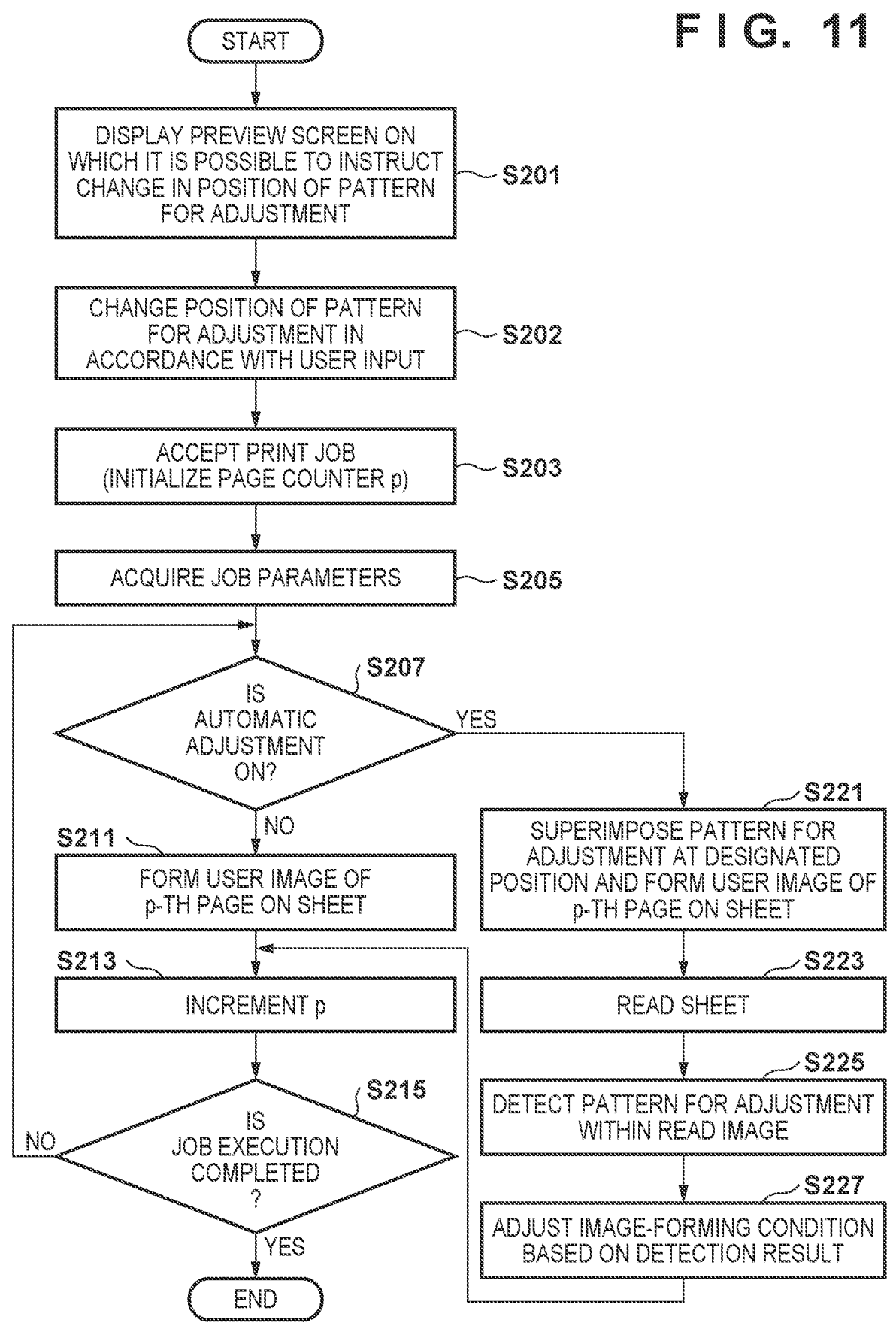

START

DISPLAY PREVIEW SCREEN ON WHICH IT IS POSSIBLE TO INSTRUCT CHANGE IN POSITION OF PATTERN FOR ADJUSTMENT — S201

CHANGE POSITION OF PATTERN FOR ADJUSTMENT IN ACCORDANCE WITH USER INPUT — S202

ACCEPT PRINT JOB (INITIALIZE PAGE COUNTER p) — S203

ACQUIRE JOB PARAMETERS — S205

S207
IS AUTOMATIC ADJUSTMENT ON?

YES

NO

S211
FORM USER IMAGE OF p-TH PAGE ON SHEET

S221
SUPERIMPOSE PATTERN FOR ADJUSTMENT AT DESIGNATED POSITION AND FORM USER IMAGE OF p-TH PAGE ON SHEET

S213
INCREMENT p

S223
READ SHEET

S225
DETECT PATTERN FOR ADJUSTMENT WITHIN READ IMAGE

S215
IS JOB EXECUTION COMPLETED?

NO

YES

S227
ADJUST IMAGE-FORMING CONDITION BASED ON DETECTION RESULT

END

IMAGE-FORMING SYSTEM, CONTROL METHOD, AND INFORMATION PROCESSING APPARATUS

BACKGROUND OF THE INVENTION

Field of the Invention

The present disclosure relates to an image-forming system, a control method, and an information processing apparatus.

Description of the Related Art

Conventionally, a technique is known in which a sheet on which an image has been formed by an image-forming apparatus is read using a reader, and an image-forming condition is automatically adjusted based on the read image. For example, Japanese Patent Laid-Open No. 2012-53089 discloses a technique in which a gamma curve, which is generated for each of a plurality of color components constituting a color image based on a result obtained by reading a gradation pattern formed on a sheet using an optical sensor, is used to adjust a density output condition of an image-forming apparatus. Japanese Patent Laid-Open No. 2012-53089 discloses examples in which gradation patterns are formed in a sheet peripheral region that is expected to be removed by trimming.

SUMMARY OF THE INVENTION

Some users may also arrange content in a sheet peripheral region. For example, a user may arrange, in a peripheral region of an input image, a code used for job management or content management (for example, a serial number, a one-dimensional barcode, or a two-dimensional barcode), his or her own color patch, or the like. If user content is arranged at a position at which a pattern for use in adjusting an image forming condition (hereinafter "pattern for adjustment") is to be formed, the pattern for adjustment and a user content image would overlap one another. Such an overlap may result in failure of the adjustment of the image forming condition due to incorrect reading of the pattern for adjustment, or may negatively affect job management or content management to be performed using the content image. Thus, there was a demand for a mechanism that allows patterns for adjustment to be arranged at appropriate positions.

In view of the above-described circumstances, the present invention aims to provide a mechanism that allows patterns for adjustment to be arranged at appropriate positions while avoiding an overlap between a pattern for adjustment to be used for adjusting an image forming condition and a user content image.

According to an aspect, there is provided an image-forming system including: an image-forming unit configured to form an image included in a print job on a sheet having a trimming region based on an image-forming condition; and at least one processor, wherein the image included in the print job includes a first user image and a second user image, and the at least one processor is configured to: control the image-forming unit to form a pattern for adjustment in the trimming region of the sheet; obtain read image data related to the pattern for adjustment formed on the sheet, the read image data being output from a reading apparatus; adjust the image-forming condition based on the read image data; and control a display to display a print preview that represents: the first user image to be formed in a print region of the sheet that is different from the trimming region, the second user image to be formed in the trimming region of the sheet, and the pattern for adjustment to be formed in the trimming region of the sheet.

Further features of the present invention will become apparent from the following description of exemplary embodiments (with reference to the attached drawings).

BRIEF DESCRIPTION OF THE DRAWINGS

FIG. 3 is a block diagram illustrating an example of a detailed configuration related to automatic image-forming-condition adjustment.

FIG. 4A is an explanatory diagram illustrating a first example of a pattern for adjustment formed on a sheet.

FIG. 4B is an explanatory diagram illustrating a second example of a pattern for adjustment formed on a sheet.

FIG. 5 is a block diagram illustrating an example of a detailed configuration of a detection circuit.

FIG. 7A is an explanatory diagram illustrating an example of a preview screen related to the first example of a pattern for adjustment.

FIG. 7B is an explanatory diagram illustrating an example of a preview screen related to the second example of a pattern for adjustment.

FIG. 8 is a flowchart illustrating an example of a flow of job execution processing according to a first practical example.

FIG. 9 is an explanatory diagram illustrating an example of a preview screen according to a second practical example.

FIG. 10 is an explanatory diagram for explaining a change of a position of a pattern for adjustment via the preview screen in FIG. 9.

FIG. 11 is a flowchart illustrating an example of a flow of job execution processing according to the second practical example.

DESCRIPTION OF THE EMBODIMENTS

Figure 1:
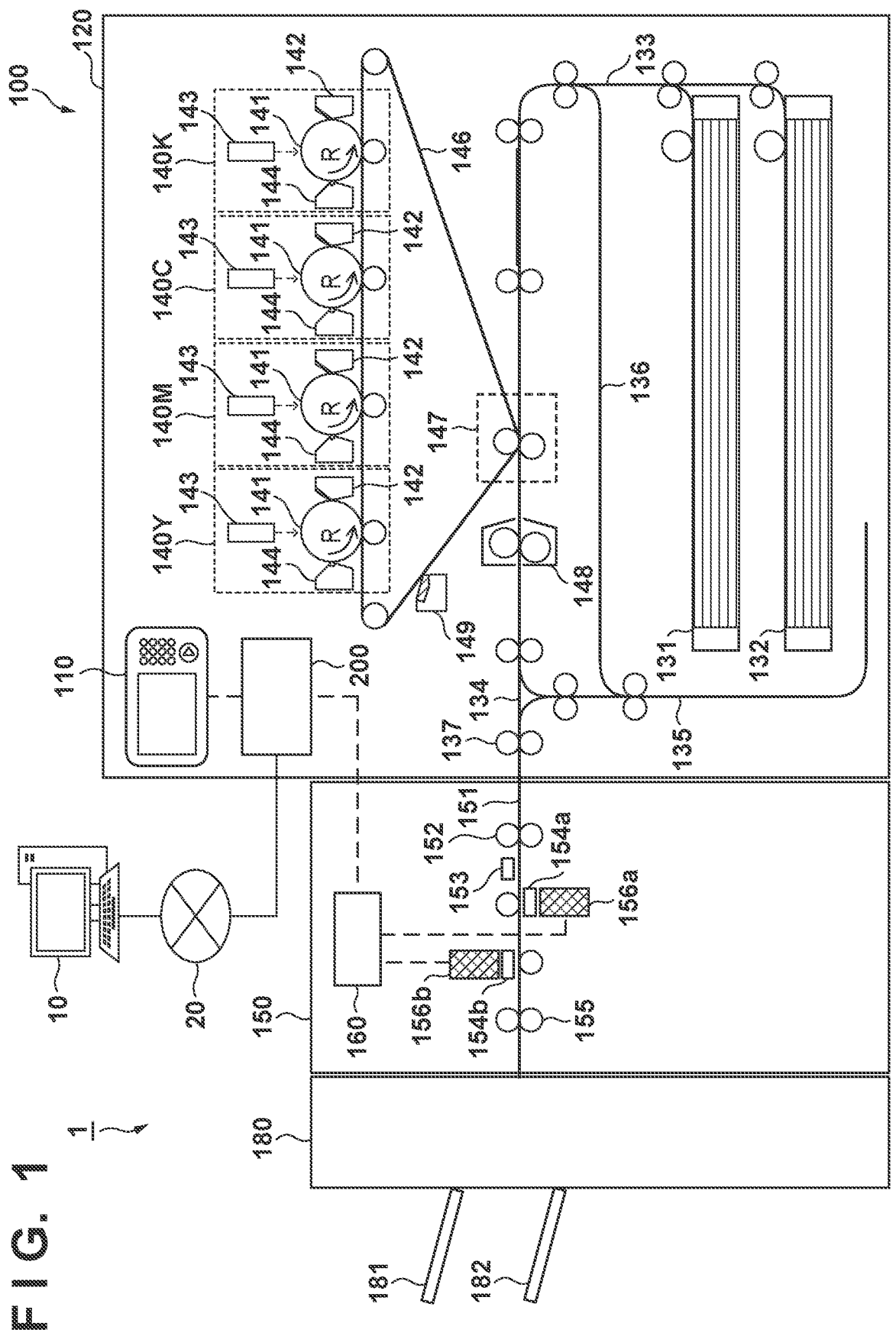
FIG. 1 is a schematic diagram illustrating an example of a configuration of a printing system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. OVERVIEW OF SYSTEM

FIG. 1 is a schematic diagram illustrating a configuration of a printing system 1 according to an embodiment. With reference to FIG. 1, the printing system 1 includes a host computer 10 and an image-forming apparatus 100. The host computer 10 is an information processing apparatus that is connected to the image-forming apparatus 100 via a network 20. The network 20 may be a wired communication network or a wireless communication network. For example, the network 20 may include one or more of a local area network (LAN), a wide area network (WAN), and a public communication network. FIG. 1 illustrates one host computer 10 and one image-forming apparatus 100; however, the printing system 1 may include a larger number of host computers and image-forming apparatuses.

The host computer 10 is an information processing apparatus that issues print jobs to be executed by the image-forming apparatus 100. As an example, the host computer 10 may be a terminal apparatus, such as a personal computer (PC) or a smartphone. As another example, the host computer 10 may be a server apparatus that issues print jobs by accepting print requests from other terminal apparatuses (not shown). Typically, a print job includes job parameters such as the number of copies to be printed, a designated type of sheet, and duplex printing/simplex printing, in addition to input image data representing a user image to be printed. The host computer 10 has a communication unit that communicates with the image-forming apparatus 100, a user interface that includes an input device and a display, and a control unit that controls the communication via the communication interface and the user interaction via the user interface.

The image-forming apparatus 100 is an apparatus that executes print jobs and forms images on sheets. In the present embodiment, the image-forming apparatus 100 is a color laser printer capable of printing color images according to the electrophotographic method. In another embodiment, the image-forming apparatus 100 may be an image-forming apparatus of another appropriate type, such as a black-and-white laser printer or an inkjet printer.

2. CONFIGURATION OF IMAGE-FORMING APPARATUS

As illustrated in FIG. 1, the image-forming apparatus 100 includes an operation panel 110, a printer unit 120, a reader unit 150, a finisher 180, and a controller 200.

2-1. Operation Panel

The operation panel 110 is a unit that provides a user interface (UI) including an input interface and an output interface. For example, the input interface may include one or more of a button, a numeric keypad, a touch panel, a switch, and a microphone. For example, the output interface may include one or more of a display, a speaker, and a lamp. The operation panel 110 accepts a user input via the input interface, and outputs the accepted user input to the controller 200. Furthermore, the operation panel 110 outputs, via the output interface, information generated by the controller 200 (for example, causes the display to display an image or causes the speaker to output sound). For example, by operating the operation panel 110, a user can instruct the image-forming apparatus 100 to execute a job or to change a job-related setting.

2-2. Printer Unit

The printer unit 120 is an image-forming unit that forms an image on a sheet based on at least one image-forming condition. In the example in FIG. 1, the printer unit 120 includes paper feed trays 131 and 132, image formers 140Y, 140M, 140C, and 140K, an intermediate transfer body 146, a transfer unit 147, a fixing device 148, and a cleaner 149.

Each of the paper feed trays 131 and 132 accommodates a stack of sheets. Sheets of the same type or sheets of different types may be accommodated in the paper feed trays 131 and 132. Two paper feed trays 131 and 132 are illustrated in FIG. 1; however, the number of paper feed trays included in the image-forming apparatus 100 is not limited to two. When a print job is executed, sheets are picked up one by one from the paper feed tray 131 or 132 (for example, the paper feed tray designated by a job parameter) by a feed mechanism, and are conveyed along a conveyance path 133.

The image former 140Y forms a yellow (Y) toner image on the intermediate transfer body 146. The image former 140M forms a magenta (M) toner image on the intermediate transfer body 146. The image former 140C forms a Cyan© toner image on the intermediate transfer body 146. The image former 140K forms a black (K) toner image on the intermediate transfer body 146. The image formers 140Y, 140M, 140C, and 140K have the same configuration as one another; thus description will be provided herein taking the configuration of the image former 140Y as an example. The image former 140Y includes a photosensitive drum 141, a charging device 142, an exposure device 143, and a developing device 144. The photosensitive drum 141 is a drum-shaped photosensitive body that has a photosensitive layer on the surface thereof. The photosensitive drum 141 rotates in the direction of the arrow R in the figure about a drum axis. The charging device 142 uniformly charges the surface of the rotating photosensitive drum 141. The exposure device 143 emits laser light to the photosensitive drum 141 in accordance with image data (in this case, image data representing a yellow image) input from the controller 200. An electrostatic latent image is formed on the surface of the photosensitive drum 141 as a result of the charged surface of the photosensitive drum 141 being scanned in the drum-axis direction by the laser light output from the exposure device 143. In the following description, a direction in which scanning by the laser light is performed (depth direction in FIG. 1) will be referred to as a main scanning direction, and a direction that is orthogonal to the main scanning direction on the surface of a drum or a sheet will be referred to as a sub-scanning direction. The developing device 144 develops the electrostatic latent image on the photosensitive drum 141 by supplying toner (in this case, yellow toner) to the surface of the photosensitive drum 141. Thus, a toner image is formed on the surface of the photosensitive drum 141. The yellow toner image formed on the surface of the photosensitive drum 141 in the image former 140Y is transferred to the intermediate transfer body 146. Furthermore, the magenta, cyan, and black toner images formed on the surfaces of the respective photosensitive drums 141 in the image formers 140M, 140C, and 140K are sequentially transferred to the intermediate transfer body 146 so as to be superimposed on the yellow toner image. Thus, a full-color toner image is formed on the intermediate transfer body 146. The intermediate transfer body 146 is an endless belt member, and rotates in the clockwise direction in the figure. The intermediate transfer body 146 conveys the full-color toner image to the position of the transfer unit 147 (transfer nip).

Under control by the controller 200, a sheet picked up from the paper feed tray 131 or 132 is conveyed to the transfer nip at the timing when the toner image on the intermediate transfer body 146 arrives at the transfer nip. The transfer unit 147 transfers the toner image carried by the intermediate transfer body 146 to the sheet at the transfer nip. The fixing device 148 includes a heater and pressing rollers. The fixing device 148 uses the heater to heat the toner image having been transferred onto the sheet, and uses the pressing rollers to press the toner image. Thus, the toner on the sheet melts, and the toner image is fixed to the sheet. FIG. 1 illustrates an example in which the image-forming apparatus 100 includes one fixing device 148; however, the image-forming apparatus 100 may further include a second fixing device that is used, for example, to increase gloss or improve fixability. The cleaner 149 is arranged downstream of the transfer nip along the path of the intermediate transfer body 146, and removes toner remaining on the intermediate transfer body 146 after the toner image has been transferred.

The conveyance path 133 branches into conveyance paths 134 and 135 downstream of the fixing device 148. The sheet having passed through the fixing device 148 is temporarily conveyed to the conveyance path 135 from the conveyance path 133. When the rear end of the sheet enters the conveyance path 135, the conveyance direction is reversed, and the sheet is discharged to the reader unit 150 from discharge rollers 137. As a result of conveyance being performed in such a manner, the sheet is discharged in a state ("face-down") in which the side thereof on which an image is formed is facing downward. Note that, in a case in which duplex printing is performed, the sheet having entered the conveyance path 135 is conveyed to a conveyance path 136, returns to the conveyance path 133 from the conveyance path 136, and passes through the transfer nip once again in a state in which the front and back sides of the sheet are reversed. A toner image is formed on the back side of the sheet by the transfer unit 147 at the transfer nip, and the toner image is fixed to the sheet in the fixing device 148. The sheet having images formed on both sides thereof is discharged to the reader unit 150 from the discharge rollers 137.

In the present embodiment, the image-forming apparatus 100 has a function of automatically adjusting at least one image-forming condition in the printer unit 120. In order to perform automatic image-forming-condition adjustment, the printer unit 120 is configured to be capable of forming one or more patterns for adjustment on a sheet together with a user image (or separately from a user image). As a first example, the at least one image-forming condition includes a condition regarding density of an image formed by the printer unit 120. In this case, the patterns for adjustment include one or more gradation patterns (first pattern) used for automatic density adjustment. As a second example, the at least one image-forming condition includes a condition regarding a position at which a user image is formed by the printer unit 120. In this case, the patterns for adjustment include one or more position determination marks (second pattern) used for measuring displacement of an image-forming position at which a user image is formed on a sheet. Automatic image-forming-condition adjustment in which such patterns for adjustment are used will be described in detail later.

2-3. Reader Unit

The reader unit 150 is a reading unit that optically reads the sheet to generate a read image. In the example in FIG. 1, the reader unit 150 includes a conveyance path 151, conveyance rollers 152, a document sensor 153, a flow-reading glass 154a, a flow-reading glass 154b, conveyance rollers 155, a first line sensor 156a, a second line sensor 156b, and a detection circuit 160. The conveyance rollers 152 accept the sheet discharged from the image-forming apparatus 100, and conveys the sheet along the conveyance path 151. For example, the document sensor 153 may be a photointerrupter including a light-emitting element and a light-receiving element, and detects the front end of the sheet having passed through the conveyance rollers 152. The first line sensor 156a optically reads the lower side of the sheet passing over the flow-reading glass 154a to generate read image data, and outputs the generated read image data to the detection circuit 160. The second line sensor 156b optically reads the upper side of the sheet passing below the flow-reading glass 154b to generate read image data, and outputs the generated read image data to the detection circuit 160. For example, the first line sensor 156a and the second line sensor 156b may be contact image sensors (CISs). The timings when the first line sensor 156a and the second line sensor 156b read the sheet may be controlled by the controller 200 based on the timing when the front end of the sheet is detected by the document sensor 153. Note that, in the following description, whenever it is unnecessary to distinguish the first line sensor 156a and the second line sensor 156b from one another, the first line sensor 156a and the second line sensor 156b are collectively referred to as a line sensor 156 by omitting the character at the end of the reference numerals. The conveyance rollers 155 discharge the sheet having passed the flow-reading glass 154b to the finisher 180.

Figure 2:
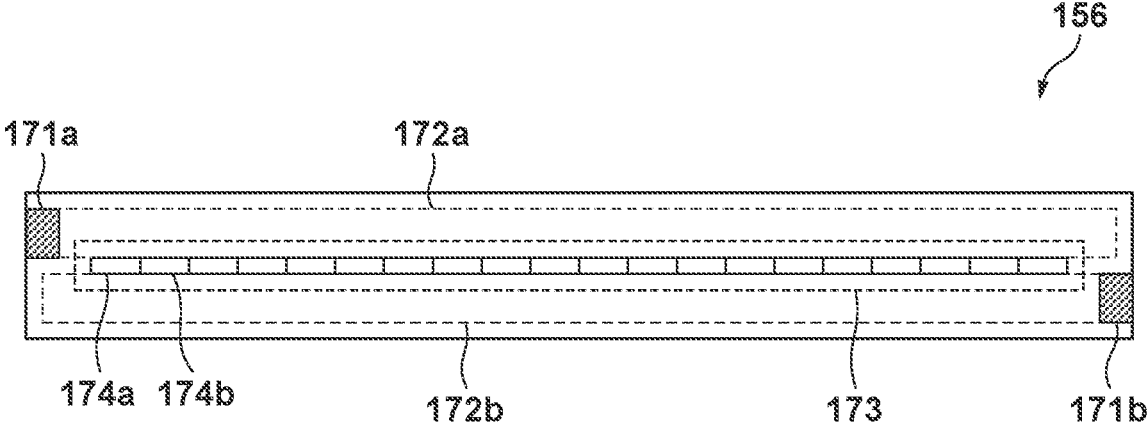
FIG. 2 is a schematic diagram illustrating an example of a configuration of a line sensor according to an embodiment.

FIG. 2 is a schematic diagram illustrating an example of a configuration of the line sensor 156. With reference to FIG. 2, the line sensor 156 incudes light sources 171a and 171b, light-guiding bodies 172a and 172b, a lens array 173, and a plurality of sensor chips 174a, 174b, . . . (also referred to as sensor chips 174). For example, each of the light sources 171a and 171b may be a light-emitting diode (LED) that emits white light. The light-guiding body 172a guides light emitted from the light source 171a toward the sheet while diffusing the light. The light-guiding body 172b guides light emitted from the light source 171b toward the sheet. The light-guiding bodies 172a and 172b have linear optical paths that are parallel with the main scanning direction of the sheet, and thus the entire area of each line of the conveyed sheet that is parallel with the main scanning direction is irradiated with white light. The lens array 173 is an optical system that images white light reflected from the surface of the sheet onto light-receiving surfaces in the sensor chips 174. The sensor chips 174 are a set of optical sensor chips that are arranged in one line along the main scanning direction of the sheet. In the present embodiment, the sensor chips 174 are formed from three rows of color filters corresponding to the three color components red (R), green (G), and blue (B), and corresponding three rows of photoelectric conversion elements. Each photoelectric conversion element receives color-component light having passed through the corresponding color filter to generate a corresponding electric signal. As a result, while the sheet passes a read position, the line sensor 156 outputs an analog image signal representing an RGB image of each line constituting a read image of the sheet.

The detection circuit 160 is a detection unit that, in a case in which automatic image-forming-condition adjustment of the printer unit 120 is performed, detects each of one or more patterns for adjustment used for automatic adjustment by performing a search in the read image. Typically, processing time for the search for each pattern for adjustment is reduced as a result of the search being performed within a known, limited search scope in which the pattern for adjustment is expected to be present. The detection circuit 160 outputs a detection result of each pattern for adjustment to the controller 200. For example, in a case in which automatic density (density output characteristic) adjustment is performed, the detection result may indicate density-related information for each detected pattern for adjustment (for example, an average luminance or density in each patch). In a case in which automatic image-forming-position adjustment is performed, the detection result may indicate measured position information for each detected pattern for adjustment (for example, absolute positional coordinates or relative displacement from a reference position). An example of a detailed configuration of the detection circuit 160 will be further described later.

2-4. Finisher

The finisher 180 is a post-processing unit that performs post-processing on the sheet having one or more image formed thereon. In the present embodiment, the finisher 180 accepts the sheet discharged from the reader unit 150, conveys the sheet along an internal conveyance path, and discharges the sheet to one of discharge trays 181 and 182 (for example, the discharge tray designated by a job parameter). The post-processing performed by the finisher 180 may include one or more of distribution, trimming, stapling, sorting, and book-binding. For example, in a case in which the finisher 180 includes a trimming mechanism (not shown), the trimming mechanism trims the sheet to a designated size and cuts off a peripheral region of the sheet. Hence, the peripheral region may be sometimes referred to as a trimming region. Fragments of the sheet that are cut off may be discarded to a purge tray (not shown) inside the finisher 180. In an embodiment, the trimming may be performed by the user using an apparatus other than the image-forming apparatus 100 without using the finisher 180.

2-5. Controller

The controller 200 has overall control over the above-described operations of the image-forming apparatus 100. For example, if the controller 200 is instructed by the user to execute a print job, the controller 200 controls the image-forming apparatus 100 to form a user image on a sheet based on input image data. Furthermore, in the present embodiment, if it is determined that automatic adjustment is to be performed, the controller 200 controls the printer unit 120 so that the printer unit 120 prints a pattern for adjustment on a sheet. For example, automatic image-forming-condition adjustment may be executed if an instruction to execute automatic image-forming-condition adjustment is provided by a user, or if an execution timing has arrived in a case in which automatic image-forming-condition adjustment is set so as to be executed periodically. A more detailed configuration related to automatic image-forming-condition adjustment will be further described in the next section.

3. AUTOMATIC ADJUSTMENT OF IMAGE-FORMING-CONDITION

FIG. 3 is a block diagram illustrating an example of a more detailed configuration of the reader unit 150 and the controller 200 related to automatic image-forming-condition adjustment.

3-1. Detailed Configuration of Controller

With reference to FIG. 3, the controller 200 includes a communication interface 211, a ROM 212, a RAM 213, a storage 214, a CPU 215, an operation interface 216, a printer interface 217, and a reader interface 218. These components are mutually connected by a system bus 219.

The communication interface 211 is a communication unit that allows the image-forming apparatus 100 to communicate with the host computer 10 and other apparatuses via the network 20. The read-only memory (ROM) 212 is a nonvolatile memory, and stores one or more computer programs for the operation of the image-forming apparatus 100, for example. The random-access memory (RAM) 213 is a volatile memory, and provides the CPU 215 with a temporary storage area for calculation. For example, the storage 214 is a large-capacity storage device such as a hard disk drive (HDD) or a solid state drive (SSD). The storage 214 stores computer programs and various types of data such as setting data and image data. The central processing unit (CPU) 215 is a processing circuit that realizes various control functions of the image-forming apparatus 100 by executing computer programs that are stored in the ROM 212 or the storage 214. In the present embodiment, the CPU 215 functions as an adjustment unit 221 and a UI control unit 222. The adjustment unit 221 adjusts at least one image-forming condition of the printer unit 120 based on a detection result of a pattern for adjustment in a read image generated by the reader unit 150. The UI control unit 222 causes a display unit to display a preview screen related to a user image formed by the printer unit 120. For example, the display unit here may be the operation panel 110 of the image-forming apparatus 100 of a display of the host computer 10. The functions of the adjustment unit 221 and the UI control unit 222 will be described in detail later. The operation interface 216 is an interface for the input and output of signals between the controller 200 and the operation panel 110. The printer interface 217 is an interface for the input and output of data and signals between the controller 200 and the printer unit 120. The reader interface 218 is an interface for the input and output of data and signals between the controller 200 and the reader unit 150.

3-2. Detailed Configuration of Reader Unit

With reference to FIG. 3, the reader unit 150 includes the document sensor 153, the first line sensor 156a, the second line sensor 156b, a first analog-to-digital converter (ADC) 157a, a second ADC 157b, an image memory 159, and the detection circuit 160.

The first ADC 157a converts an analog image signal input from the first line sensor 156a (analog image signal representing a read image of a first side of a sheet) into digital read image data, and outputs the read image data after the conversion to the detection circuit 160. The second ADC 157b converts an analog image signal input from the second line sensor 156b (analog image signal representing a read image of a second side of a sheet) into digital read image data, and outputs the read image data after the conversion to the detection circuit 160. The image memory 159 stores read image data that is generated or processed in the reader unit 150. The detection circuit 160 is a detection unit that, in a case in which automatic adjustment of at least one image-forming condition in the printer unit 120 is performed, detects one or more patterns for adjustment in a read image. For example, the detection circuit 160 may be implemented as a dedicated processing circuit such as a field-programmable gate array (FPGA) or an application-specific integrated circuit (ASIC), or may be implemented as a combination of a general-purpose processor and software.

3-3. Automatic Adjustment Function

For automatic adjustment of at least one image-forming condition in the printer unit 120, the adjustment unit 221 of the controller 200 controls the printer unit 120 to form one or more patterns for adjustment on a sheet. A first example of a pattern for adjustment is a gradation pattern used for automatic density adjustment. FIG. 4A illustrates how a gradation pattern, which is the first example, is formed on a sheet 300.

With reference to FIG. 4A, the sheet 300 includes a main print region 310 and a peripheral region 315. The peripheral region 315 is a region surrounding the outside of the main print region 310. User content to be printed is mainly arranged in the main print region 310; however, some content may also be arranged in the peripheral region 315. In the peripheral region 315, four gradation patterns 320Y, 320M, 320C, and 320K are formed. The gradation patterns 320Y, 320M, 320C, and 320K are respectively used to adjust the density output characteristic of the colors yellow (Y), magenta (M), cyan (C), and black (K). Each gradation pattern 320 includes a patch region 321, and a mask region 322 surrounding the patch region 321. The patch region 321 includes a plurality of patch images of the corresponding color component, and the gradation value may differ among the patch images. The mask region 322 is a single-color region that has the same color as the background color (for example, white).

The detection circuit 160 of the reader unit 150 detects each gradation pattern 320 based on read image data, extracts the patch region 321 in the detected gradation pattern 320, and calculates an average pixel value (RGB value) for each patch image. Then, the detection circuit 160 outputs, to the controller 200, an average pixel value of each gradation of each color component.

Figure 5:
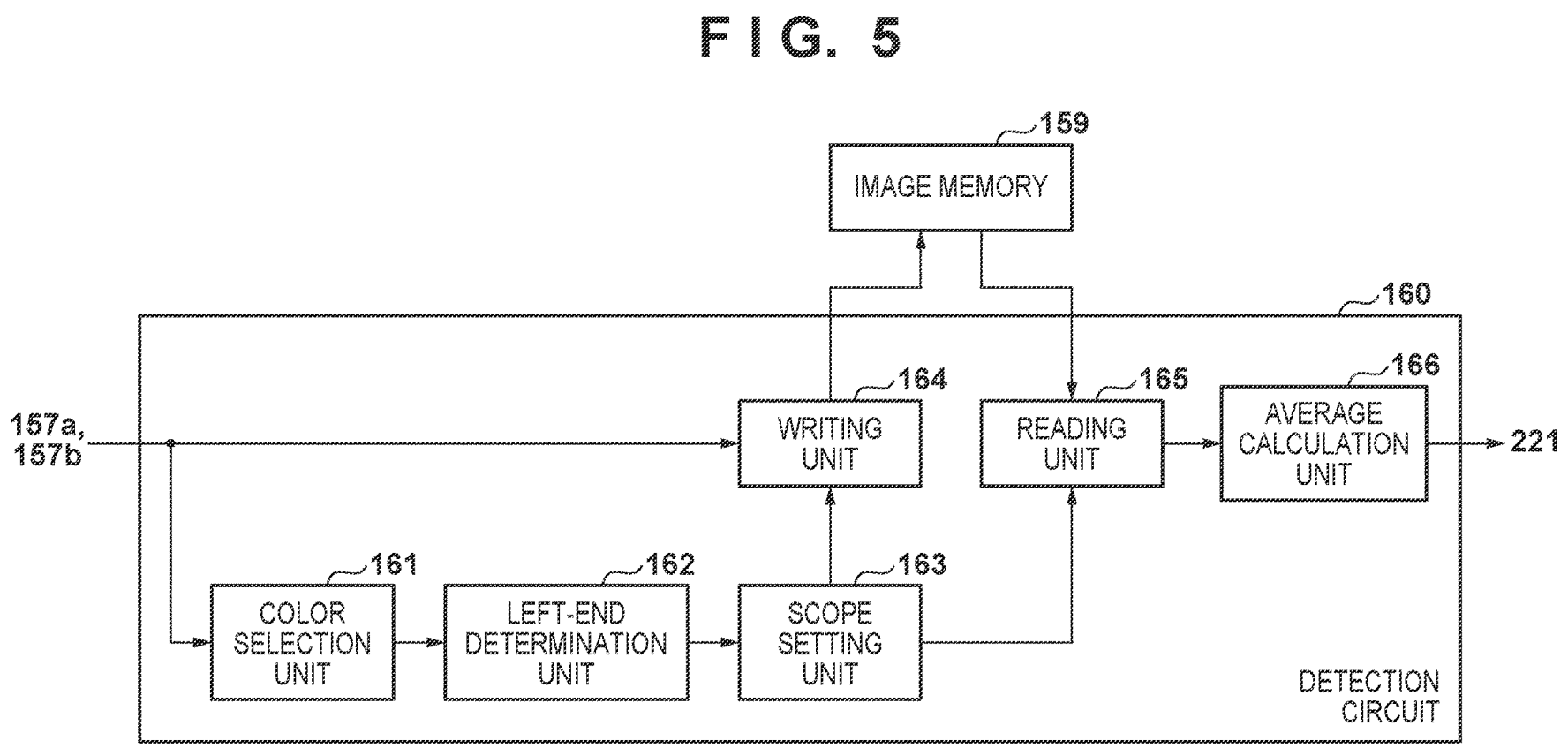

FIG. 5 is a block diagram illustrating an example of a detailed configuration of the detection circuit 160 pertaining to the first example. With reference to FIG. 5, the detection circuit 160 includes a color selection unit 161, a left-end determination unit 162, a scope setting unit 163, a writing unit 164, a reading unit 165, and an average calculation unit 166.

The color selection unit 161 selects one of the RGB color component images constituting the read image data. Here, in order to detect the gradation patterns 320 accurately, the selection of color component here may be performed in accordance with the background color of the sheet (for example, a color component having the greatest color difference from the background color may be selected).

The left-end determination unit 162 determines, within the read image of the color component selected by the color selection unit 161, the position of the left end of the patch region 321 of each gradation pattern 320 that is subject to detection. Here, "left" corresponds to the upstream side in a pixel array along a main scanning direction line. For example, the left-end determination unit 162 may determine the left ends of patch regions 321 by sequentially scanning pixel values in each line of the read image and comparing each pixel value with a predefined threshold. If the background color of the sheet is white, a patch region 321 may be detected if a pixel value (or luminance value) falls below a threshold. In the present embodiment, the search for each pattern for adjustment based on scanning of pixel values by the left-end determination unit 162 is performed within a corresponding known search scope, as described above. Note that, in order to improve determination accuracy, the left-end determination unit 162 may simultaneously scan pixel values in a plurality of lines and determine the position of the left end of a patch region 321 using a plurality of pixel values.

Based on a result of the determination by the left-end determination unit 162, the scope setting unit 163 sets a scope (hereinafter "cut-out scope") of each patch image to be cut out from the read image. For example, suppose that a result of the determination by the left-end determination unit 162 indicates the positional coordinates of the upper-left corner of the patch region 321 in the gradation pattern 320Y described with reference to FIG. 4A. The size of the patch region 321 in the main scanning direction and sub-scanning direction is already known by the scope setting unit 163. Accordingly, based on the positional coordinates of the upper-left corner and the known size, the scope setting unit 163 can set cut-out scopes for the patch images of respective gradations in the gradation pattern 320Y For example, the cut-out scopes that are set here may be scopes slightly smaller than respective patch images constituting the patch region 321 that are obtained by removing areas in the vicinity of the four sides of the patch images.

The writing unit 164 cuts out, from the read image (RGB image), patch images within each scope set by the scope setting unit 163, and writes patch image data representing the cut-out patch images to the image memory 159. The reading unit 165 reads patch image data that has been written to the image memory 159, and outputs the patch image data to the average calculation unit 166.

Based on each piece of patch image data input from the reading unit 165, the average calculation unit 166 calculates, for each of the four color components Y, M, C, and K, an average pixel value (RGB value) of the gradation of each patch image (cut out from the read image). Then, the average calculation unit 166 outputs the calculated average pixel values to the adjustment unit 221 of the controller 200.

The adjustment unit 221 adjusts the density output characteristics of the image formers 140Y, 140M, 140C, and 140K based on the average pixel values input from the detection circuit 160. The adjustment here may be performed, for example, by using some conversion formula or look-up table that accepts a set of average pixel values as input and outputs a parameter specifying a density output characteristic after the adjustment. As an example, if a detection result of the gradation pattern 320Y indicates that print density is excessively low in a Y-component intermediate gradation region, the adjustment unit 221 may cause the image former 140Y to increase its output of density in the intermediate gradation region. As another example, if a detection result of the gradation pattern 320M indicates that print density is excessively high in an M-component low gradation region, the adjustment unit 221 may cause the image former 140M to decrease its output of density in the low gradation region.

A second example of a pattern for adjustment is a position determination mark used for measuring displacement (misalignment) of an image-forming position at which a user image is formed on a sheet. FIG. 4B illustrates how a position determination mark, which is the second example, is formed on a sheet 350.

With reference to FIG. 4B, the sheet 350 includes a main print region 360 and a peripheral region 365. Four position determination marks 371, 372, 373, and 374 are formed in the peripheral region 365. The position determination marks 371, 372, 373, and 374 are used to determine displacement of the image-forming position in the main scanning direction and the sub-scanning direction. Each mark may have any appropriate shape, and while the marks are circular in the example in FIG. 4B, the marks may be trim marks in another example.

The detection circuit 160 of the reader unit 150 detects each of the position determination marks 371, 372, 373, and 374 by scanning read image data, and measures the positional coordinates (for example, coordinates of the centroid position) of each of the detected marks. Then, the detection circuit 160 outputs the measured positional coordinates to the controller 200. Based on the positional coordinates input from the detection circuit 160, the adjustment unit 221 of the controller 200 adjusts a position on a sheet at which an image is formed by the image formers 140Y, 140M, 140C, and 140K. The adjustment here may include enlargement or reduction in size in addition to translation in the main scanning direction and the sub-scanning direction. Furthermore, the adjustment of image-forming position may be performed individually for each color component.

Note that the gradation patterns illustrated in FIG. 4A and the position determination marks illustrated in FIG. 4B may be formed on the same sheet, and both the adjustment of density output characteristics and the adjustment of image-forming position may be executed. Furthermore, the gradation patterns illustrated in FIG. 4A may also be used for the adjustment of image-forming position. Furthermore, each pattern for adjustment may be formed on only one side of a sheet or on both sides of a sheet.

4. PROVISION OF PREVIEW SCREEN

The printer unit 120 can form the above-described patterns for adjustment for an automatic adjustment function so as to be superimposed on an image region of a sheet in which a user image is formed. That is, while the patterns for adjustment may typically be formed in the peripheral region of a sheet as described with reference to FIGS. 4A and 4B, the peripheral region may at least partially overlap a region in which a user image is formed. Thus, one or more patterns for adjustment in the peripheral region may positionally interfere with content arranged by the user. For example, the user may arrange, in the peripheral region of an input image, a code used for job management or content management (for example, a serial number, a one-dimensional barcode, or a two-dimensional barcode), marks serving as a reference for work such as trimming, a his or her own color patch, or the like. In view of this, in the first practical example described in the following, the UI control unit 222 presents, to the user in a print preview screen for presenting a preview of a user image, a preview of each pattern for adjustment as well. The display position of each display object in the preview screen corresponds to the position on a sheet at which the corresponding pattern for adjustment is to be formed. In the later-described second practical example, the UI control unit 222 can accept, via a similar preview screen, a user input instructing a change of a position on a sheet at which each pattern for adjustment is to be formed (change from a first position to a second position).

In either practical example, the preview screen may, for example, be called from a print setting screen (or other appropriate setting screen) that is provided to make settings relating to a print job to be executed.

4-1. First Practical Example

Figure 6:
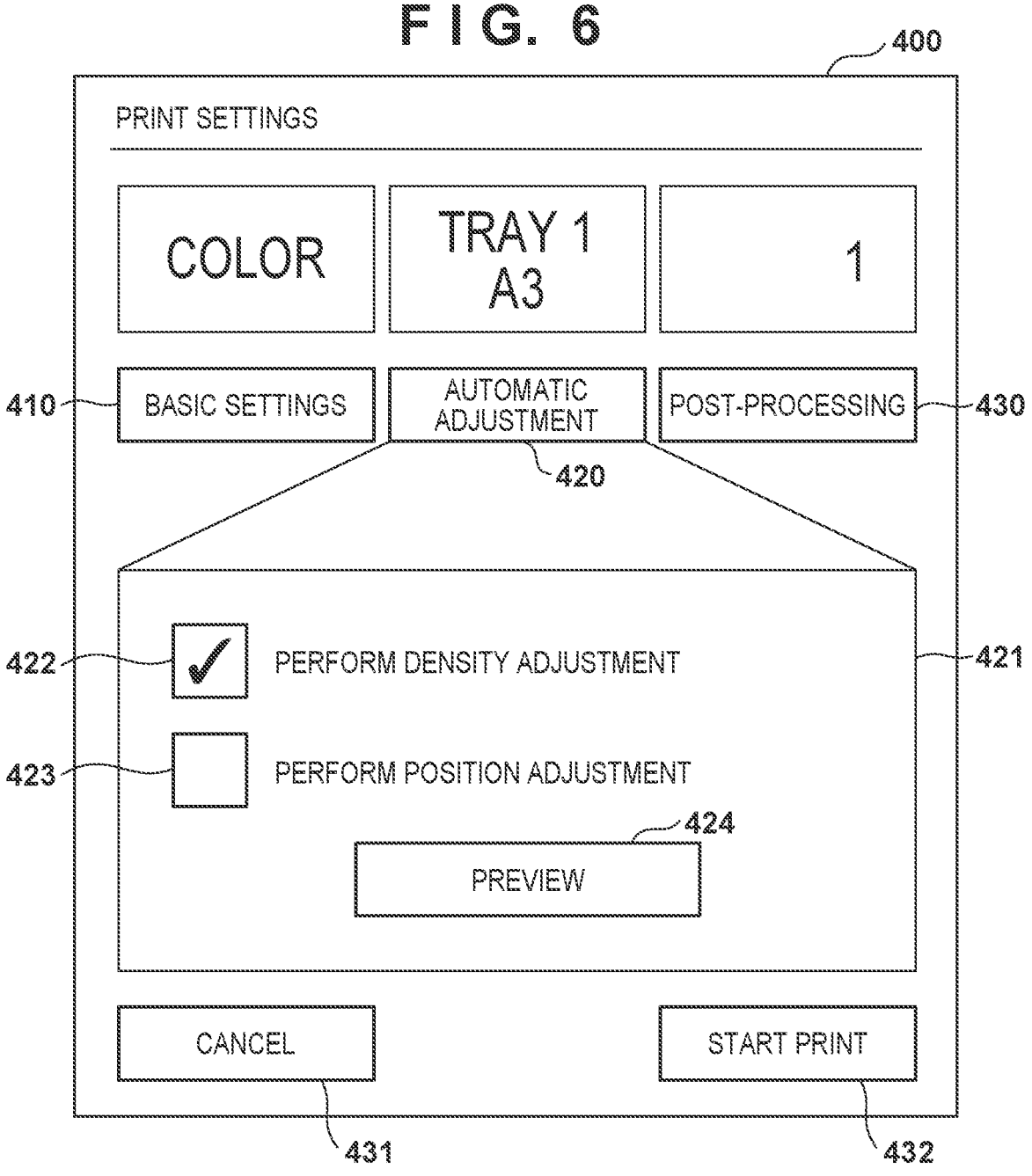
FIG. 6 is an explanatory diagram illustrating an example of a configuration of a print setting screen.

FIG. 6 is an explanatory diagram illustrating an example of a configuration of a print setting screen 400 that may be provided by the UI control unit 222. With reference to FIG. 6, the print setting screen 400 includes a basic setting button 410, an automatic adjustment button 420, an automatic adjustment setting area 421, a post-processing button 430, a cancel button 431, and a print start button 432.

The basic setting button 410 is a button for calling basic setting items of a print job. The automatic adjustment button 420 is a button for calling setting items related to the above-described automatic adjustment function of the image-forming apparatus 100. The post-processing button 430 is a button for calling setting items related to a post-processing function of the image-forming apparatus 100. The cancel button 431 is button for cancelling the issuance of a print job and closing the print setting screen 400. The print start button 432 is a button for issuing a print job and causing the printer unit 120 to start image forming. In the example in FIG. 6, the automatic adjustment setting area 421 is displayed in the print setting screen 400 as a result of the user having operated the automatic adjustment button 420. The automatic adjustment setting area 421 includes a density adjustment checkbox 422, a position adjustment checkbox 423, and a preview button 424.

The density adjustment checkbox 422 is an object for enabling or disabling automatic density adjustment. The position adjustment checkbox 423 is an object for enabling or disabling automatic image-forming-position adjustment. In the example in FIG. 6, only automatic density adjustment is enabled because the density adjustment checkbox 422 is on and the position adjustment checkbox 423 is off. The preview button 424 is made operable only if at least one of the checkboxes 422 and 423 is on. For example, if the user operates the preview button 424 in a state in which only the density adjustment checkbox 422 is on, a preview screen 500 illustrated in FIG. 7A is displayed on the display.

FIG. 7A is an explanatory diagram illustrating an example of a preview screen 500 related to the first example of a pattern for adjustment. With reference to FIG. 7A, the preview screen 500 includes a preview area 510, a return button 531, a page number field 532, page switching buttons 533, and a slider 534. In the preview area 510, the UI control unit 222 presents to the user a preview of a user image based on input image data of a print job. Furthermore, because automatic density adjustment is enabled, the UI control unit 222 superimposes display objects 511Y, 511M, 511C, and 511K corresponding to the gradation patterns 320Y, 320M, 320C, and 320K on the respective display positions.

In the example in FIG. 7A, the user image includes auxiliary content 542 representing a barcode, in addition to main content 541 in the center. The main content 541 and the auxiliary content 541 may be referred to as a first user image and a second user image, respectively. The auxiliary content 542 is arranged at the upper left corner of the user image; however, in the preview area 510, the auxiliary content 542 is partially concealed by the display object 511Y corresponding to the gradation pattern 320Y. This means that, if the print job is executed in this state, the auxiliary content 542 would be partially omitted on a sheet as a result of the gradation pattern 320Y being superimposed thereon. By viewing this preview screen 500, the user can realize the necessity of rearranging the auxiliary content 542 at a position at which the auxiliary content 542 would not overlap with the patterns for adjustment. Alternatively, the user may also choose to disable automatic density adjustment in the present print job.

The return button 531 is a button for closing the preview screen 500 and returning to the print setting screen 400. The page number field 532 is a field for displaying the total number of pages and the page number of the currently displayed page in a case in which the content to be printed extends over multiple pages. The page switching buttons 533 are buttons for switching the page displayed in the preview area 510 to a preceding page or a succeeding page. The slider 534 is an object that allows the scale, on the screen, of the preview image displayed in the preview area 510 to be changed.

FIG. 7B is an explanatory diagram illustrating an example of a preview screen 550 related to the second example of a pattern for adjustment. In the second example, the preview screen 550 has been called in a state in which the density adjustment checkbox 422 is off and the position adjustment checkbox 423 is on in the print setting screen 400. With reference to FIG. 7B, the preview screen 550 includes a preview area 560, the return button 531, the page number field 532, the page switching buttons 533, and the slider 534. In the preview area 560, the UI control unit 222 displays a preview of a user image based on input image data of a print job. Furthermore, because automatic image-forming-position adjustment is enabled, the UI control unit 222 displays display objects 561, 562, 563, and 564 representing the position determination marks 371, 372, 373, and 374 at the respective display positions.

In the example in FIG. 7B, the user image includes several pieces of auxiliary content 592 and 593 representing trim marks (also called crop marks), in addition to main content 591 in the center. The main content 591 and the auxiliary content 592 and 593 may be referred to as a first user image and a second user image, respectively. For example, the auxiliary content 592 is arranged at the upper left corner of the user image; however, in the preview area 560, the auxiliary content 592 is partially concealed by the display object 561 corresponding to the position determination mark 371. This means that, if the print job is executed in this state, the auxiliary content 592 would be partially omitted on a sheet as a result of the position determination mark 371 being superimposed thereon. The auxiliary content 593 is also partially concealed by the display object 562 corresponding to the position determination mark 372. By viewing this preview screen 550, the user can realize the necessity of reconsidering the arrangement of the auxiliary content 592 and 593 in the user image. Alternatively, the user may also choose to disable automatic image-forming-position adjustment for the present print job to avoid printing of position determination marks.

Note that, in a case in which automatic adjustment of both density and image-forming position is enabled, the four display objects illustrated in FIG. 7A and the four display objects illustrated in FIG. 7B may all be displayed on the preview screen. Furthermore, each display object is not limited to the illustrated example. For example, each display object may be a simple frame or icon indicating a scope occupied by the corresponding pattern for adjustment.

FIG. 8 is a flowchart illustrating an example of a flow of job execution processing that may be executed by the image-forming apparatus 100 in the present practical example. Note that, in the following description, "processing step" will be abbreviated as "S".

First, in step S101, in response to a call by the user, the UI control unit 222 of the controller 200 of the image-forming apparatus 100 causes the display of the host computer 10 or the operation panel 110 to display a preview screen related to a print job. In a case in which the function for automatically adjusting at least one image-forming condition is enabled, the preview screen displayed here may include a display object representing a pattern for adjustment at a display position corresponding to a position of the pattern for adjustment on a sheet.

Next, in step S103, upon being instructed by the user to start executing a print job, the UI control unit 222 accepts the print job. For example, the print job is received from the host computer 10 via the network 20 and the communication interface 211, or is generated in accordance with a command that is input from the operation panel 110. The print job includes input image data representing a user image to be printed. Here, a page counter p that is a variable identifying the page to be printed is initialized to zero.

Next, in step S105, the UI control unit 222 acquires job parameters for the accepted print job. The job parameters include, in addition to parameters for basic settings such as the number of copies to be printed, a designated type of sheet, and duplex printing/simplex printing, a parameter indicating whether or not the automatic adjustment function is enabled for at least one image-forming condition. The processing following this point branches at step S107 depending on whether or not the automatic adjustment function is enabled. If the automatic adjustment function is enabled (automatic adjustment is on), processing proceeds to step S121. If the automatic adjustment function is not enabled (automatic adjustment is off), processing proceeds to step S111.

If the automatic adjustment function is not enabled, the printer unit 120 forms a user image of the p-th page on a sheet under control by the controller 200 in step S111. Next, in step S113, the page counter p is incremented (1 is added). Next, in step S115, it is determined whether or not the execution of the print job is complete. For example, in a case in which the page counter p has not reached the total number of sheets to be printed, it is determined that the execution of the print job is incomplete and processing returns to step S107. On the other hand, in a case in which the page counter p has reached the total number of sheets to be printed, it is determined that the execution of the print job is complete and the flowchart in FIG. 8 ends.

If the automatic adjustment function is enabled, the printer unit 120 forms a user image of the p-th page on a sheet under control by the controller 200 in step S121. Here, the adjustment unit 221 superimposes, on the user image, display objects representing one or more patterns for adjustment used for automatic adjustment. Note that, because the user has already checked the positions of the patterns for adjustment on a preview screen prior to the execution of the job in the present embodiment, it can be expected that a situation in which the patterns for adjustment interfere with user content on a sheet against the user's intention will not occur.

Next, in step S123, a line sensor 156 of the reader unit 150 optically reads the sheet on which the user image and the patterns for adjustment have been formed to generate a read image. Next, in the read image generated in step S123, the detection circuit 160 of the reader unit 150 searches for each of the one or more patterns for adjustment used for automatic adjustment and detects each pattern for adjustment in step S125.

Next, in step S127, the adjustment unit 221 of the controller 200 adjusts at least one image-forming condition of the printer unit 120 based on a detection result input from the detection circuit 160. For example, in a case in which automatic density adjustment is enabled, the detection result input from the detection circuit 160 may indicate an average pixel value for each color component and for each gradation that has been calculated based on patch images in gradation patterns detected in the read image. For example, the adjustment unit 221 converts the average pixel values into density values, and adjusts the density output characteristic of each of the image formers 140Y, 140M, 140C, and 140K such that a density difference from a desired density is compensated for. Note that the adjustment of a density output characteristic based on reading of gradation patterns or patch images may be performed in accordance with any known method, and detail description thereof is omitted herein.

Next, processing proceeds to step S113, and the page counter p is incremented (1 is added) as described above. Next, in step S115, it is determined whether the execution of the print job is complete, and processing returns to step S107 if it is determined that the execution of the print job is incomplete. On the other hand, the flowchart in FIG. 8 ends if it is determined that the execution of the print job is complete.

Note that, while FIG. 8 illustrates a flow of processing in which one or more patterns for adjustment are superimposed on all pages of user images, patterns for adjustment may be superimposed only on the first page (or one or more pages designated by the user). Image-forming-condition adjustment may be applied to subsequent pages of the same print job, or may be applied to one or more subsequent print jobs.

According to the above-described first practical example, before executing a print job, the user can easily check, on a screen, whether content that the user has arranged in a user image will or will not overlap a pattern for adjustment to be formed on a sheet for automatic image-forming-condition adjustment. For example, if the user content is rearranged in the user image so as not to interfere with patterns for adjustment, the user content will not be concealed by patterns for adjustment on a printed sheet. Patterns for adjustment are usually formed in the peripheral region of a sheet. Thus, the above-described mechanism is particularly beneficial in a case in which the user arranges some auxiliary content (for example, a code for management, trim marks, or a his or her own color patch) in the peripheral region.

4-2. Second Practical Example

In the second practical example, the UI control unit 222 is configured to receive, on a preview screen, a user input instructing a change of a position at which a pattern for adjustment used for automatic image-forming-condition adjustment is to be formed. The UI control unit 222 changes a position on a sheet of a pattern for adjustment selected by the accepted user input from an original (for example, a default) first position to a designated second position. As a matter of course, in a case in which a plurality of patterns for adjustment are used, it is also possible to change positions of some of the patterns for adjustment while maintaining positions of the other patterns for adjustment at their original positions. The printer unit 120 forms each pattern for adjustment at a position designated by the user input (those with unchanged positions are formed at their original positions). In a case in which a position of a given pattern for adjustment has been changed to a second position, the UI control unit 222 may change a search scope within which the detection circuit 160 searches for the pattern for adjustment in a read image (for example, a scope within which pixel values are scanned) to a scope corresponding to the second position resulting from the change.

In the present practical example as well, the UI control unit 222 causes the display to display the print setting screen 400 described with reference to the FIG. 6 to allow the user to make print job settings. Then, when the user operates the preview button 424 in the automatic adjustment setting area 421 in the print setting screen 400, the UI control unit 222 causes the display to display a preview screen.

FIG. 9 is an explanatory diagram illustrating an example of a preview screen 600 that may be displayed in the present practical example. Note that, here, only automatic density adjustment is enabled. With reference to FIG. 9, the preview screen 600 includes the preview area 510, a return button 631, an enter button 632, the page number field 532, the page switching buttons 533, and the slider 534. In the preview area 510, the UI control unit 222 displays a preview of a user image based on input image data of a print job. Furthermore, because automatic density adjustment is enabled, the UI control unit 222 displays display objects 511Y, 511M, 511C, and 511K representing the gradation patterns 320Y, 320M, 320C, and 320K at the respective default display positions.

The preview screen 600 further includes input objects 611Y, 611M, 611C, and 611K respectively for moving positions of the gradation patterns 320Y, 320M, 320C, and 320K on a sheet. The input object 611Y includes a pair of numerical value input fields to which relative amounts of movement for moving the position of the gradation pattern 320Y in an x direction and a y direction with respect to the default position can be input. Here, the x direction and the y direction may respectively correspond to the main scanning direction and the sub-scanning direction. Similarly, each of the input objects 611M, 611C, and 611K includes a pair of numerical value input fields to which relative amounts of movement can be input for the corresponding one of the gradation patterns 320M, 320C, and 320K. Here, description will be provided of an example in which each input object 611 accepts an input of relative amount of movement; however, each input object 611 may accept an input of changed (absolute) positional coordinates instead of relative amount of movement. Therefore, the input objects 611Y, 611M, 611C, and 611K may be regarded as examples of an operable object for changing an absolute or relative position of the pattern for adjustment which is displayed on a print preview.

In the example in FIG. 9, the user image includes auxiliary content 642 representing a two-dimensional barcode. The auxiliary content 642 is arranged at the upper left corner of the user image; however, in the preview area 510, the display object 511Y corresponding to the gradation pattern 320Y is present at a position (first display position) partially concealing the auxiliary content 642. This means that, if the print job is executed in this state, the auxiliary content 642 would be partially omitted on a sheet as a result of the gradation pattern 320Y being superimposed thereon. Thus, the user operates the input object 611Y to change the position of the gradation pattern 320Y. FIG. 10 illustrates a state in which the display object 511Y of the gradation pattern 320Y has moved downward (to a second display position) as a result of the user having input an amount of movement to a numerical value input field 612 in the input object 611Y Consequently, the overlap of the display object 511Y with the auxiliary content 642 is eliminated.

In the preview screen 600, the UI control unit 222 may accept, instead of a user input designating a relative amount of movement or changed positional coordinates via the above-described input objects, a user operation of moving a display object representing a pattern for adjustment. For example, an operation of moving a display object 511 within the preview area 510 in FIG. 9 may be regarded as a user input instructing a change of a position on a sheet at which the corresponding gradation pattern 320 is to be formed. For example, the operation may be a drag operation performed on the display object 511. In this case, the display object 511 may be regarded as an example of an operable object for changing an absolute or relative position of the pattern for adjustment which is displayed on a print preview. Drag amounts of the display object 511 in the x direction and the y direction correspond to relative amounts of movement of the corresponding gradation pattern 320 in the main scanning direction and the sub-scanning direction.

The enter button 632 is a button for reflecting, in the print job settings, a change of a position that the user has performed on the preview screen 600. For example, if the user operates the enter button 632 in the state illustrated in FIG. 10, the UI control unit 222 closes the preview screen 600 and displays the print setting screen 400 once again. Then, if the user operates the print start button 432 (see FIG. 6) in the print setting screen 400, a print job is issued, and image forming by the printer unit 120 is started. In the print job, the printer unit 120 forms a pattern for adjustment, whose position has been changed by the user, at the changed position on a sheet. The return button 631 is a button for closing the preview screen 600 and returning to the print setting screen 400. If the return button 631 is operated, any change of a position that the user has performed in the preview screen 600 is cancelled.

In FIGS. 9 and 10, an example of a UI allowing a change of a position of gradation patterns used for automatic density adjustment is illustrated; however, a similar UI allowing a change of a position may also be provided for position determination marks used for automatic image-forming-position adjustment.

FIG. 11 is a flowchart illustrating an example of a flow of job execution processing that may be executed by the image-forming apparatus 100 in the present practical example.

First, in step S201, in response to a call by the user, the UI control unit 222 of the controller 200 of the image-forming apparatus 100 causes the display of the host computer 10 or the operation panel 110 to display a preview screen related to a print job. In a case in which the function for automatically adjusting at least one image-forming condition is enabled, the preview screen displayed here may include, together with a display object representing a pattern for adjustment, an input object that is capable of accepting a user input for changing a position of the pattern for adjustment.

Next, in step S202, in accordance with a user input accepted via the preview screen, the UI control unit 222 changes a position on a sheet at which at least one pattern for adjustment is to be formed from a default position to a position designated by the user.

Next, in step S203, upon being instructed by the user to start executing a print job, the UI control unit 222 accepts the print job. The print job includes input image data representing a user image to be printed. Here, a page counter p that is a variable identifying the page to be printed is initialized to zero.

Next, in step S205, the UI control unit 222 acquires job parameters for the accepted print job. The job parameters include, in addition to the above-described parameters for basic settings, a parameter indicating whether or not the automatic adjustment function is enabled for at least one image-forming condition. If the automatic adjustment function is enabled, the job parameters include a parameter indicating positions on a sheet at which one or more corresponding patterns for adjustment are to be formed (for example, positions following the change in step S202). The processing following this point branches at step S207 depending on whether or not the automatic adjustment function is enabled. If the automatic adjustment function is enabled, processing proceeds to step S221. If the automatic adjustment function is not enabled, processing proceeds to step S211.

If the automatic adjustment function is not enabled, the printer unit 120 forms a user image of the p-th page on a sheet under control by the controller 200 in step S211. Next, in step S213, the page counter p is incremented. Next, in step S215, it is determined whether or not the execution of the print job is complete. For example, in a case in which the page counter p has not reached the total number of sheets to be printed, it is determined that the execution of the print job is incomplete and processing returns to step S207. On the other hand, in a case in which the page counter p has reached the total number of sheets to be printed, it is determined that the execution of the print job is complete and the flowchart in FIG. 11 ends.

If the automatic adjustment function is enabled, the printer unit 120 forms a user image of the p-th page on a sheet under control by the controller 200 in step S221. Here, the adjustment unit 221 superimposes display objects representing one or more patterns for adjustment used for automatic adjustment at positions indicated by the job parameters acquired in step S205.

Next, in step S223, a line sensor 156 of the reader unit 150 optically reads the sheet on which the user image and the patterns for adjustment have been formed to generate a read image. Next, in the read image generated in step S223, the detection circuit 160 of the reader unit 150 searches for each of the one or more patterns for adjustment used for automatic adjustment and detects each pattern for adjustment in step S225. Here, in a case in which a position on a sheet at which a pattern for adjustment is to be formed has been changed, a scope within which the pattern for adjustment is searched for is changed in accordance with the change of position.

Next, in step S227, the adjustment unit 221 of the controller 200 adjusts at least one image-forming condition of the printer unit 120 based on a detection result input from the detection circuit 160. Here, image-forming-condition adjustment may be performed according to the same method as that described in relation to step S127 in FIG. 8.

Next, processing proceeds to step S213, and the page counter p is incremented as described above. Next, in step S215, it is determined whether the execution of the print job is complete, and processing returns to step S207 if it is determined that the execution of the print job is incomplete. On the other hand, the flowchart in FIG. 11 ends if it is determined that the execution of the print job is complete.

Note that, as was the case in the first practical example, patterns for adjustment may be superimposed only on the first page (or one or more pages designated by the user) in the present practical example as well. Image-forming-condition adjustment may be applied to subsequent pages of the same print job, or may be applied to one or more subsequent print jobs.

According to the above-described second practical example, on a preview screen, the user can change the position of a pattern for adjustment as appropriate while checking the positional relationship between content arranged by the user and one or more patterns for adjustment to be formed on a sheet by the image-forming apparatus, before executing a print job. That is, the user can avoid an overlap between a user content image and a pattern for adjustment used for image-forming-condition adjustment. For example, a change of a position of a pattern for adjustment may be performed by inputting a relative amount of movement or changed positional coordinates, or by an operation of moving a display object representing the pattern for adjustment. In this case, a position of a pattern for adjustment can be smoothly or precisely adjusted with ease in tune with the position of content arranged by the user. As a matter of course, in the present embodiment as well, the user may eliminate an overlap between a pattern for adjustment and content by rearranging the content, disabling the automatic adjustment function, or the like, instead of moving the pattern for adjustment.

In a case in which a position on a sheet at which a pattern for adjustment is to be formed is changed in accordance with a user input, a scope within which the pattern for adjustment is searched for in a read image may also be changed in accordance with the change of the position of the pattern for adjustment. By changing the search scope in such a manner, failure of automatic image-forming-condition adjustment due to an error in detection of a pattern for adjustment can be prevented while maintaining the processing time reduced by narrowing down the search scope.

In the present description, description has been mainly provided of examples in which the UI control unit 222 of the image-forming apparatus 100 controls the interaction with the user via print preview screens; however, the host computer 10 may provide a UI control function similar to that of the UI control unit 222. In such a case, the communication unit of the host computer 10 communicates with the image-forming apparatus 100, and the control unit of the host computer 10 causes a display to display an above-described print preview screen (which may include an operable object for changing an absolute or relative position of a pattern for adjustment) related to a user image formed by the image-forming apparatus 100.

5. OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-033071, filed on Mar. 3, 2023 which is hereby incorporated by reference herein in its entirety.

What is claimed is:

1. An image-forming system comprising:

an image-forming unit configured to form an image included in a print job on a sheet having a trimming region based on an image-forming condition; and at least one processor, wherein the image included in the print job includes a first user image and a second user image, and the at least one processor is configured to:

control the image-forming unit to form a pattern for adjustment in the trimming region of the sheet;

obtain read image data related to the pattern for adjustment formed on the sheet, the read image data being output from a reading apparatus;

adjust the image-forming condition based on the read image data; and control a display to display a print preview that represents:

the first user image to be formed in a print region of the sheet that is different from the trimming region, the second user image to be formed in the trimming region of the sheet, and the pattern for adjustment to be formed in the trimming region of the sheet.

2. The image-forming system according to claim 1, wherein the at least one processor is capable of changing a position of the pattern for adjustment relative to the second user image.

3. The image-forming system according to claim 2, wherein there is a button on a screen that displays the print preview, the button being used for changing the position of the pattern for adjustment relative to the second user image.

4. The image-forming system according to claim 1, wherein the at least one processor is capable of changing a position of the pattern for adjustment on the sheet.

5. The image-forming system according to claim 4, wherein there is a button on a screen that displays the print preview, the button being used for changing the position of the pattern for adjustment on the sheet.

6. The image-forming system according to claim 4, wherein the at least one processor is configured to accept an instruction for changing the position of the pattern for adjustment through a drag operation on a screen that displays the print preview.

7. The image-forming system according to claim 1, wherein the second user image is a serial number.

8. The image-forming system according to claim 1, wherein the second user image is a barcode.

9. The image-forming system according to claim 1, wherein the image-forming condition is a condition for adjusting density of an image to be formed by the image-forming unit.

10. The image-forming system according to claim 1, wherein the image-forming condition is a condition for adjusting a position on a sheet at which the first user image is to be formed by the image-forming unit.

11. A control method performed by at least one processor of an image-forming system, wherein the image-forming system includes an image-forming unit configured to form an image included in a print job on a sheet having a trimming region based on an image-forming condition, and the image included in the print job includes a first user image and a second user image, the method comprising:

controlling the image-forming unit to form a pattern for adjustment in the trimming region of the sheet;

obtaining read image data related to the pattern for adjustment formed on the sheet, the reading data being output from a reading apparatus;

adjusting the image-forming condition based on the read image data; and controlling a display to display a print preview that represents:

the first user image to be formed in a print region of the sheet that is different from the trimming region, the second user image to be formed in the trimming region of the sheet, and the pattern for adjustment to be formed in the trimming region of the sheet.

12. An information processing apparatus comprising:

a communication unit configured to communicate with an image-forming apparatus that forms a user image on a sheet based on at least one image-forming condition; and a control unit configured to control a display unit to display a preview screen related to the user image formed by the image-forming apparatus, wherein the image-forming apparatus is configured to:

form, on the sheet, a pattern for adjustment used for adjusting the at least one image-forming condition together with the user image, and adjust the at least one image-forming condition based on a detection result of the pattern for adjustment in a read image generated by optically read the sheet, and wherein the control unit is configured to:

control a display object representing the pattern for adjustment to be displayed at a first display position on the preview screen, the first display position corresponding to a first position on a sheet at which the pattern for adjustment is to be formed; and in response to a user input instructing a change of a position of the pattern for adjustment, change a position on a sheet at which the pattern for adjustment is to be formed from the first position to a second position; and control the display object to be displayed at a second display position on the preview screen, the second display position corresponding to the second position on a sheet.

* * * * *